United States Patent [19]

Stalmeir et al.

[11] Patent Number: 5,501,305
[45] Date of Patent: Mar. 26, 1996

[54] DEVICE FOR GENERATING A REVERSIBLE WORKING STROKE

[75] Inventors: Joseph Stalmeir; Erich Fuderer, both of Munich, Germany

[73] Assignee: Knorr-Bremse AG, Munich, Germany

[21] Appl. No.: 265,213

[22] Filed: Jun. 24, 1994

[30] Foreign Application Priority Data

Sep. 8, 1993 [DE] Germany .......................... 43 30 440.0

[51] Int. Cl.$^6$ .............................. F16D 65/16; F16D 65/32
[52] U.S. Cl. .................... 188/167; 188/153 R; 188/72.7; 188/72.9
[58] Field of Search ........................... 188/33, 72.2, 72.7, 188/72.9, 107, 153 R, 166, 167, 170, 171, 173

[56] References Cited

U.S. PATENT DOCUMENTS

| | | | |
|---|---|---|---|
| 1,727,742 | 9/1929 | Athimon | 188/167 X |
| 4,109,765 | 8/1978 | Johannesen | 188/72.7 |
| 4,290,507 | 9/1981 | Brown | 188/72.9 X |
| 4,676,542 | 6/1987 | Besold . | |

FOREIGN PATENT DOCUMENTS

| | | | |
|---|---|---|---|
| 689704 | 9/1930 | France | 188/167 |
| 891499 | 3/1944 | France | 188/167 |
| 2730959 | 1/1979 | Germany | 188/153 R |
| 7915980 | 2/1981 | Germany . | |
| 3500056 | 7/1986 | Germany . | |
| 4032885.6 | 4/1992 | Germany . | |
| 4041455 | 6/1992 | Germany . | |

Primary Examiner—Robert J. Oberleitner
Assistant Examiner—Kevin D. Rutherford
Attorney, Agent, or Firm—Barnes & Thornburg

[57] ABSTRACT

A force generating system including a lever mechanism fixed with respect to and interacting with a varying elastic deformation force take-up system and at a force application point of a given lever arm length; an energy-storing force generating device which acts upon the lever mechanism at a changeable position of its lever arm for supplying a portion of the energy stored in it when the lever arm length is increased and for at least partially taking up again the energy taken up by the force take-up system, when the lever arm length is decreased; and an adjusting arrangement for the controllable changing of the position in which the force generating device acts upon the lever arm of the lever mechanism. The force generating system is used in a disk brake system.

31 Claims, 8 Drawing Sheets

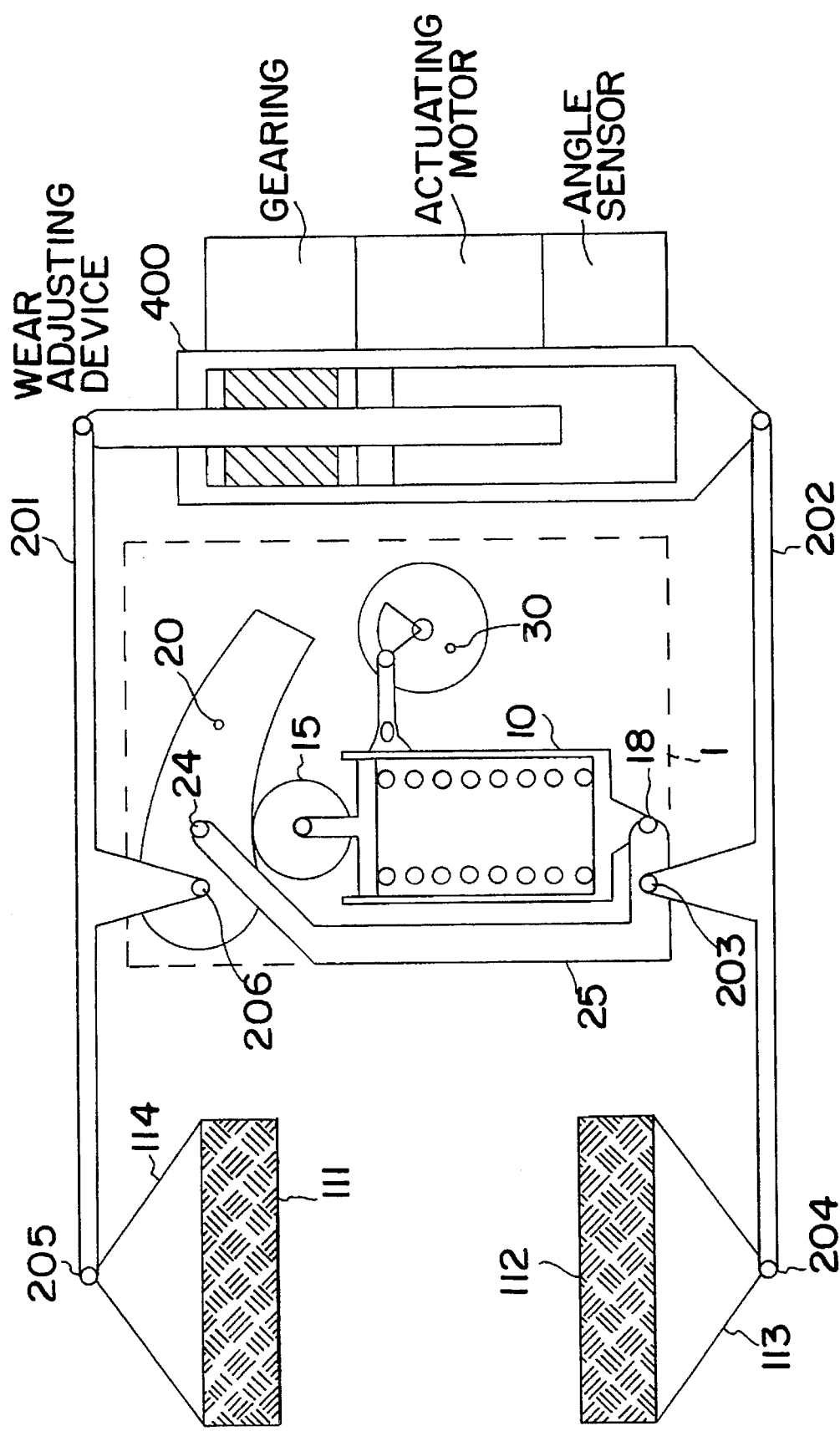

DEVICE FOR GENERATING A REVERSIBLE WORKING STROKE

BACKGROUND AND SUMMARY OF THE INVENTION

The present invention relates generally to a device system for generating a reversible working stroke and more specifically to such a system wherein the force varies during the working stroke. Objects of the present invention are also application devices for disk brakes which are controlled by the force generating device according to the invention.

Force generating systems of the above-mentioned type are provided for generating a reversible working stroke which acts in a defined direction and whose force is to be variable for a corresponding apportioning of the delivered output. In the invention, the working stroke generated by the force generating system acts upon a force take-up system of the type which, because of an essentially linearly increasing or decreasing elastic deformation, develops a counterforce which changes as a function of the stroke. Typical force take-up systems of this type are, for example, application devices for disk brakes, wherein the force which occurs when the brake shoes are pressed against the brake disk. Because of the limited rigidity of the application system, the force is converted to a corresponding elastic deformation of this system which exercises a corresponding counterforce on the force generating system. Although the force generating system according to the invention is intended particularly for use in application systems of this type for disk brakes, it can also be used in other force take-up systems which, when acted upon by force, develop counterforces in a comparable manner.

Particularly in the preferred field of usage of the invention, specifically with respect to application systems for disk brakes, a number of force generating systems are known for the application of the braking force. In the case of application systems provided for rail vehicles, the application force is generated, for example, by compressed-air cylinders whose compressed air, as a rule, is generated by the locomotive. The compressed-air cylinder, whose construction is known and therefore does not have to be explained any further at this point, when acted upon by compressed air, supplies its force by a brake clamp to the respective disk brake. This brake clamp has two clamp levers. On the brake-disk-side end of the brake levers, one brake shoe respectively is disposed which acts upon the brake disk. The brake levers are connected with one another in an articulated manner on a center connection element as well as on a connection element on the other end which faces away from the brake disk. At least one of the two connecting elements can be changed in its length for the application of the clamp levers and for the purpose of braking is adjusted by the driving rod of the compressed-air cylinder in such a manner that the brake clamp is applied. Concerning details about the construction of a brake clamp of this type and its operation, reference is made, for example, to German Patent Documents DE-PS 1 249 606 or DE-GM 17 04 651.

An alternative application system also used with disk brakes for road vehicles, among others, makes use of a so-called floating caliper which is disposed in a slidable manner in parallel to the axis of rotation of the disk brake. On one side of the disk brake, the caliper has a pressure-actuated, air-actuated or hydraulically actuated force generating device which presses, possibly by a mechanical power transmission, the brake shoe situated on this side against the disk brake. Whereupon, the caliper is displaced and, as a result, also presses the opposite brake shoe against the disk brake.

A disadvantage of the known force generating systems for application arrangements of this type is that, for the application and release of the brake (if the respective application device is operated in a so-called "fail-safe" arrangement, in the case of which an application takes place when the pressure medium is removed or fails), a comparatively large amount of energy has to be applied. This is the result of the relatively large required working stroke. Also, an application arrangement of this type is a system which deforms elastically when acted upon by pressure and which acts against the force generating device with a counterforce which increases as a function of the working stroke or the brake load and whose overcoming requires a large amount of energy. It is obvious that this high energy requirement should not be neglected, particularly in the case of trains with a large number of cars.

Another disadvantage of the known force generating system in the form of compressed-air cylinders or hydraulic cylinders is that the respective supplied force can be controlled only via the working pressure of the pressure medium which is comparatively difficult. Thus, for example, in the brake systems of rail vehicles, a sensitively apportioned braking operation can hardly be implemented.

It is an object of the invention to provide a force generating system for a force take-up system which is distinguished by a very low energy requirement and by a good apportioning capacity of the respective supplied force.

This object is achieved by the present invention.

The invention is based on the idea of minimizing the energy required by a force generator for the essentially linearly rising elastic deformation force take-up system, which produces a counterforce which changes as a function of the stroke. Also, during the reversal of the working stroke, the relaxation of the force take-up system, "charges" the energy-storing force generator used for generating the working stroke so that a correspondingly large portion of the energy applied during the force output is recovered. The invention therefore provides a type of "energy swing" between the two conditions "energy in the force generator" and "energy in the force take-up system", whereby finally a very high efficiency can be achieved. Because the energy-storing force-generating device acts upon the force take-up system via a force-transmitting lever mechanism, it is also achieved that the delivered force can be apportioned in an excellent manner.

As far as details are concerned, the operating principle of the force generating system is implemented by a lever mechanism including a pivot point fixed with respect to the force take-up system and including a lever arm for interconnecting with the force take-up system, of a given lever arm length. The energy-storing force generator acts upon the lever mechanism at a variable position of its lever arm. An adjusting arrangement controllably changes the position at which the force generator acts upon the lever arm of the lever mechanism. Tests have indicated that the energy to be applied by the adjusting device is in fact significantly lower than in the case of conventional force generating systems, such as compressed-air cylinders and the like.

The force generating device is preferably dimensioned such that the least amount of energy which is taken up by the respective force take-up system in the case of the maximal stroke or the largest lever arm length can be stored in it. In this manner, as little energy as possible is lost so that the efficiency can be optimized correspondingly.

A spring-loaded arrangement may be used, for example, as the energy storing force generator. This type of a spring-loaded arrangement is to be considered as a standard component so that the manufacturing will not be difficult. Optionally, as an alternative, a compressed-air-loaded arrangement or the like may also be used.

Preferably, the force generating device is arranged such that it is disposed in a swivellable manner with respect to the lever mechanism in a stationary bearing such that it rests against a lever arm surface of the lever mechanism in a swivellable manner. With respect to the bearing of the force generating device, this lever arm surface is constructed to essentially have the shape of a circular arc. This arrangement has the advantage that the adjusting arrangement of the force generating device, which is required for changing the working stroke of the force generating device, only needs to carry out a swivel movement which can be implemented in a simple manner.

Therefore, depending on the field of application of the force generating device, many different embodiments may be used for the adjusting arrangement. For example, it is possible to provide an electric adjusting motor which is coupled with the force generating device in a suitable manner. The coupling to the force generating device may be carried out in that, for example, an eccentric driven by the motor rests with its eccentric surface against a corresponding supporting surface of the force generating device. Depending on the angle of rotation of the motor shaft, a different swivelling angle of the force generating device is achieved. However, as an alternative, it is also possible to swivel the force generating device in a suitable manner by a connecting-rod driving device.

Furthermore, there is the possibility of generating the control force required for the adjusting arrangement by a compressed-air cylinder so that a pneumatic force generating device can be provided. From a control-technological point of view, the pneumatic force generating device hardly differs from a conventional pneumatic force generating device. The significant difference is the clearly lower energy consumption and the better apportioning capacity of the supplied force.

Another aspect of the invention, which is to be considered important, is that the lever arm surface of the lever mechanism may be designed such that the force which the force generating device requires for enlarging the working stroke is smaller than zero. In this manner, when the adjusting arrangement fails because of an absence of compressed air or electricity, as a result of this "gradient" of the lever arm surface, an automatic enlargement of the working stroke is achieved. When the present invention is used in disk brake application devices, the automatic enlargement can be utilized for carrying out an automatic braking operation ("fail-safe function").

As an alternative, it is naturally also possible to provide on the lever arm surface a reversed "gradient" in the direction of the reduction of the working stroke so that when the control force of the adjusting arrangement fails, the "0" working stroke of the force generating device is automatically obtained. In braking systems, this type of a function is used in practice particularly in the case of tunnel vehicles where it must be ensured that, if a braking device fails, the tunnel can be left at any time.

Furthermore, the gradient of the lever arm surface according to the invention has the advantage that the desired emergency position of the working stroke is achieved automatically when the mechanical coupling of the adjusting arrangement to the force generating device fails, for example, because of breakage of the mechanical coupling member.

Also, according to the invention, it may be possible to change the curved contour of the lever arm surface such that, despite the elastic extension of all force transmitting parts, only a minimal stroke of the force generating device is required. In this manner, it may be possible to further improve the energy balance.

It is recommended to select the respective swivelling angle range of the force generating device such that the force generating device, in the position which corresponds to the "0" working stroke, rests against a position of the lever arm surface of the lever mechanism in which the lever arm length is smaller than or equal to zero with respect to the working stroke direction. Irrespective of the respective selected gradient of the lever arm surface, a defined initial position is achieved by this "parking position" of the force generating device, According to a further development of the invention, it is recommended to couple the force generating device by a correspondingly designed sliding element, with the lever arm surface in a displaceable manner. A roller may be provided for this purpose which is disposed on the lever-side end of the force generating device.

In order to prevent the lever arm of the lever mechanism from swivelling beyond the respective desired end positions, it is preferred that the lever arm rests against correspondingly placed stationary stops.

The force application point by which the lever mechanism acts upon the force take-up system may be provided on the lever arm of the lever mechanism as well as on an additional eccentric constructed on the lever mechanism. This force transmission from this application point to a pressure or tension rod may take place, for example, by a joint or the like.

In the simplest case, the lever bearing of the lever mechanism may be constructed as a bushing, although optionally sliding bearings or roller bearings may also be used for this purpose. According to the further development of the invention, it is advantageous in some applications to construct the lever bearing as a half-shell bearing. In this case, the force generating device, which is supported on the lever arm surface, clamps the lever mechanism in on the side opposite the half-shell bearing and therefore prevents the lever mechanism from falling out of the half-shell bearing.

A further aspect of the invention which is considered significant is that the force generated by the force generating system, in contrast to conventional devices, can be measured in a extremely simple manner in that the momentary swivelling angle of the force generating device is detected and/or in that the momentary working stroke is measured. The swivally angle can be sensed by a sensor which senses either the position in which the force generating device acts upon the lever arm of the lever mechanism or which senses the momentary swivelling angle of the force generating device. The momentary working stroke may be sensed by a sensor which detects the momentary working stroke either directly or by way of the momentary angular position of the lever arm of the lever mechanism.

When the force generating system according to the invention is used as an application device of a disk brake, it is recommended that both above-mentioned force detecting variants be provided to determine a possible wear of the lining of the brake shoes from a difference of the two output signals of the sensors. Specifically, if a wear of the brake shoes has occurred, the brake shoes will rest against the brake disk at a later point in time or at a different angular position of the lever arm so that so that the elastic deformation of the application device, which is reflected by the working stroke, occurs at a correspondingly later point in time. The difference signal of the two sensors can therefore be used for the control of an adjusting device.

When the force generating system according to the invention is used for an application device comprising a floating caliper, it is recommended to couple the end of the rod of the force generating device to the force application point to act against the brake shoe disposed in the floating caliper. In this manner, a particularly simple construction of the application device is achieved.

However, when the force generating system according to the invention is used for an application device which comprises a braking clamp, as an alternative, the force generating system may form either the center connection element of the two clamp levers or the end connection element which faces away from the brake disk. In this case, the respective other connection element of the two clamp levers is preferably formed by a wear adjusting device. A particularly space-saving arrangement which is easy to produce can be achieved in this case when the swivellable force generating device is disposed coaxially with respect to one of the two pivot bearings of the center or end connection element of the corresponding clamp lever of the brake clamp. Optionally, in this manner a single bolt may be sufficient for the bearing of the clamp lever and of the force generating device. However, in the case of this bearing variant of the force generating device, it should be endeavored to arrange its axis with respect to the lever arm element of the lever mechanism in such a manner that no buckling moment can be exercised on it.

When the invention is used for one of the disk-brake application devices, it is generally possible to shape the lever arm surface of the lever mechanism advantageously in such a manner that the application stroke for overcoming the venting play can be carried out by a slight swivel movement of the force generating device. That is, the lever arm surface has, for example, a progressively "decreasing" slope in the application direction. As a result, it is possible to carry out the application stroke very rapidly so that a correspondingly larger variation range of the respective generated force is available for the braking operation.

Other objects, advantages and novel features of the present invention will become apparent from the following detailed description of the invention when considered in conjunction with the accompanying drawings.

BRIEF DESCRIPTION OF THE DRAWINGS

FIG. 7 is a view of a schematic construction of a modified embodiment of the force generating system illustrated in FIG. 5 which is arranged in the center connection element of the two clamp levers of the brake clamp.

DETAILED DESCRIPTION OF PREFERRED EMBODIMENTS

Figure 1:
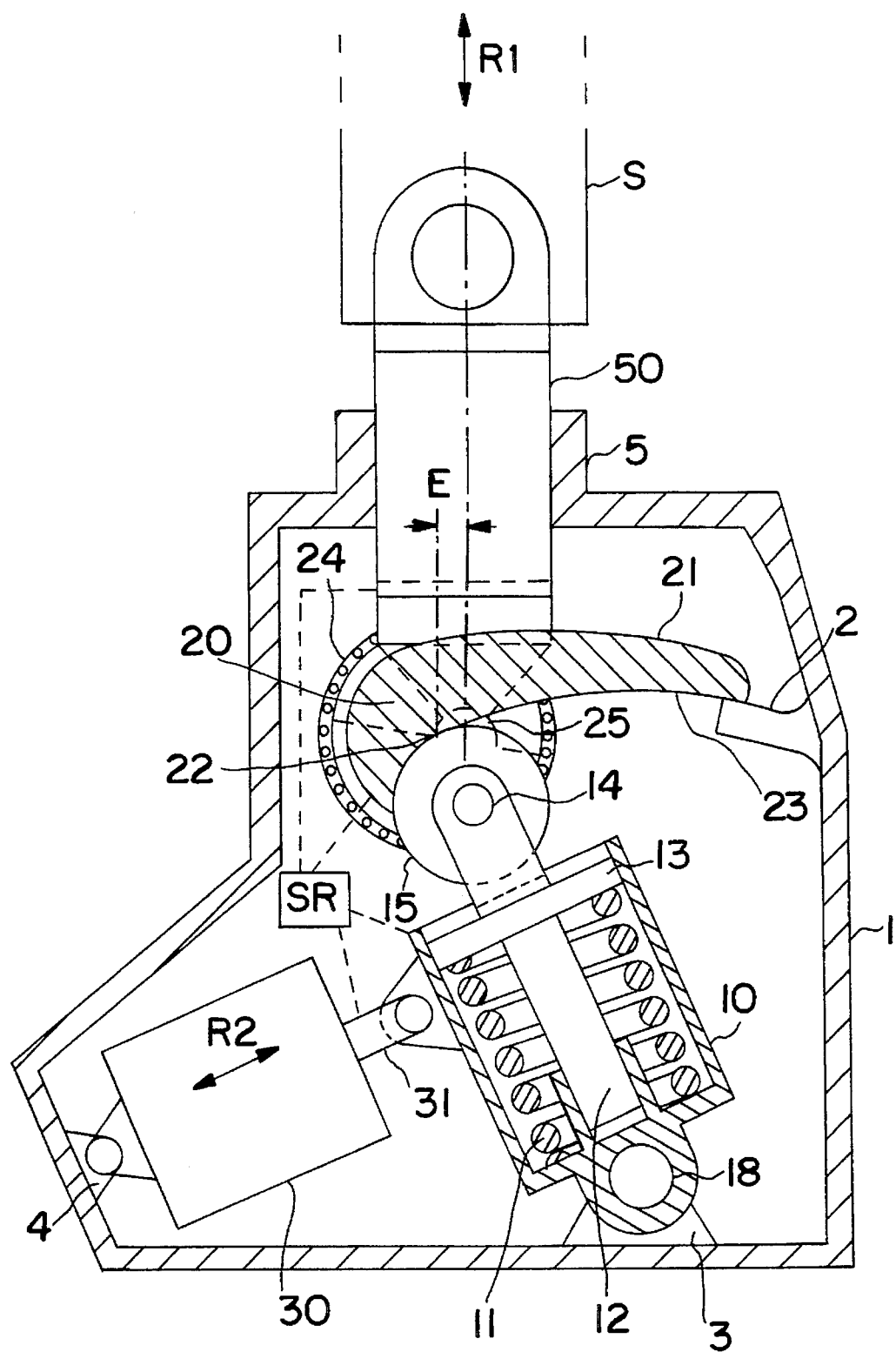
FIG. 1 is a view of a first embodiment of the force generating system according to the invention.

FIG. 1 is a schematic view of the basic construction of a first embodiment of the force generating system according to the invention. This force generating system generates a reversible working stroke which acts in the direction of an arrow R1 upon a force take-up system S which is shown only schematically. The force take-up system S has the characteristic of generating, as a function of the respective working stroke of the force generating system according to the invention, a corresponding counterforce as a result of an elastic deformation.

The force generating system is accommodated in a housing 1 which is a stationary with respect to the force take-up system S. In its housing part which faces the force take-up system S, the housing 1 has a recess 5 constructed as a guide in which a pressure or tension rod 50 is guided in a sliding manner. By way of a coupling element, which is not shown in detail, the rod 50 is coupled with the force take-up system S. The end of the rod 50 which is inside the housing 1 is rotatably coupled with an eccentric 25 of a rotary lever mechanism 20. The rotary lever mechanism 20, in turn, is rotatably disposed in a bearing 24 fixed to the housing 1. In addition, the rotary lever mechanism 20 has a lever arm 21 which, in the rest position illustrated in FIG. 1, rests on the stop 2 fixed to the housing 1.

On the face of the housing 1 which faces away from the rod 50, a bearing block 3 is provided on which an energy-storing force generating device 10 is swivellably connected by a bearing 18. The force generating device 10, which in the following will be called a "force cartridge", forms a spring-loaded device and consists essentially of a cylindrical housing which accommodates a flat coil spring 11. On the lower end of the housing of the force cartridge 10, an inner-cylindrical guide is constructed in a concentric manner in which a pressure rod 12 is slidingly disposed. A pressure take-up disk 13 is disposed on the pressure rod 12 and is guided by the interior walls of the housing of the force cartridge 10 and transmits the pressure force exercised by the spring 11 to the pressure rod 12. On the outer end of the pressure rod 12, a bearing 14 is constructed in which a roller 15 is rotatably disposed.

To the lateral wall of the force cartridge 10 which is on the left in FIG. 1, a control element 31 is coupled in an articulated manner and transmits the adjusting force generated by an adjusting arrangement 30 in the direction of an arrow R2 to the force cartridge 10. The respective stroke of the control element 31 with respect to a bearing of the adjusting arrangement 30, which is fixed to the housing, is directly proportional to the force of the force generating device 10 which supplied at the rod 50.

In response to an electric, pneumatic or hydraulic control signal, the adjusting arrangement 30 is capable of swivelling the force cartridge 10 into the respective desired position.

On the side facing the force cartridge 10, the lever arm 21 of the lever mechanism 20 has a lever arm surface 23 on which the roller 15 of the pressure rod 12 of the force cartridge 10 rolls when it is swivelled. In the rest position illustrated in FIG. 1 in which the force generating device supplies no force, the force of the spring 11 acts directly on the pivot of the lever arm 21 which has reference number 22 so that the effective lever arm length is equal to zero. This end position of the force cartridge 10 may also be selected such that the effective lever arm length assumes a slightly negative value so that the lever arm 21 is pressed with a defined force against the stop 2 of the housing 1.

In the following, the method of operation of the force generating device shown in FIG. 1 will be explained in detail. In the illustrated rest position of the force cartridge 10, the effective lever arm length, as mentioned, is essentially equal to zero so that the rod 50 which transmits the working stroke to the force take-up system S assumes its lowest position. As soon as the adjusting arrangement 30 starts to swivel the force cartridge 10 toward the right of the control element 31, the eccentric 25 and therefore the rod 50 is pressed in the direction of the force take-up system S. The respective path corresponds to the ratio of the respective swivel path of the force cartridge 10 to the eccentricity, marked E, of the eccentric 25 with respect to the pivot 22 of the lever mechanism 20. The force transmitted to the force take-up system S therefore rises proportionally to the swivel angle of the force cartridge 10. The energy transmitted to the force take-up system S in this case is supplied exclusively by the spring 11 of the force cartridge 10 if the "gradient" of the lever arm surface 23 with respect to the adjusting arrangement 30 is larger than or equal to zero. In contrast, if the gradient of the lever arm surface 23 is directed to the adjusting arrangement 30, a slight force is required for the swivelling of the force cartridge 10.

When the adjusting arrangement 30 swivels the force cartridge 10 by the control element 31 to the left again for reducing the force affecting the force take-up system S, the energy stored in the force take-up system S as a result of its elastic deformation is transmitted by the lever arm 21 to the force cartridge 10. Thereby, spring 11 is at least partially tensioned by the energy stored in the force take-up system S. The adjusting arrangement 30 therefore requires correspondingly less energy for the tensioning of the spring 11 so that the total energy consumption for the increasing and decreasing of the working stroke is correspondingly low. The force generating device according to the invention therefore works with a very high efficiency or requires only a low control force for the adjusting arrangement 30.

Figure 2:
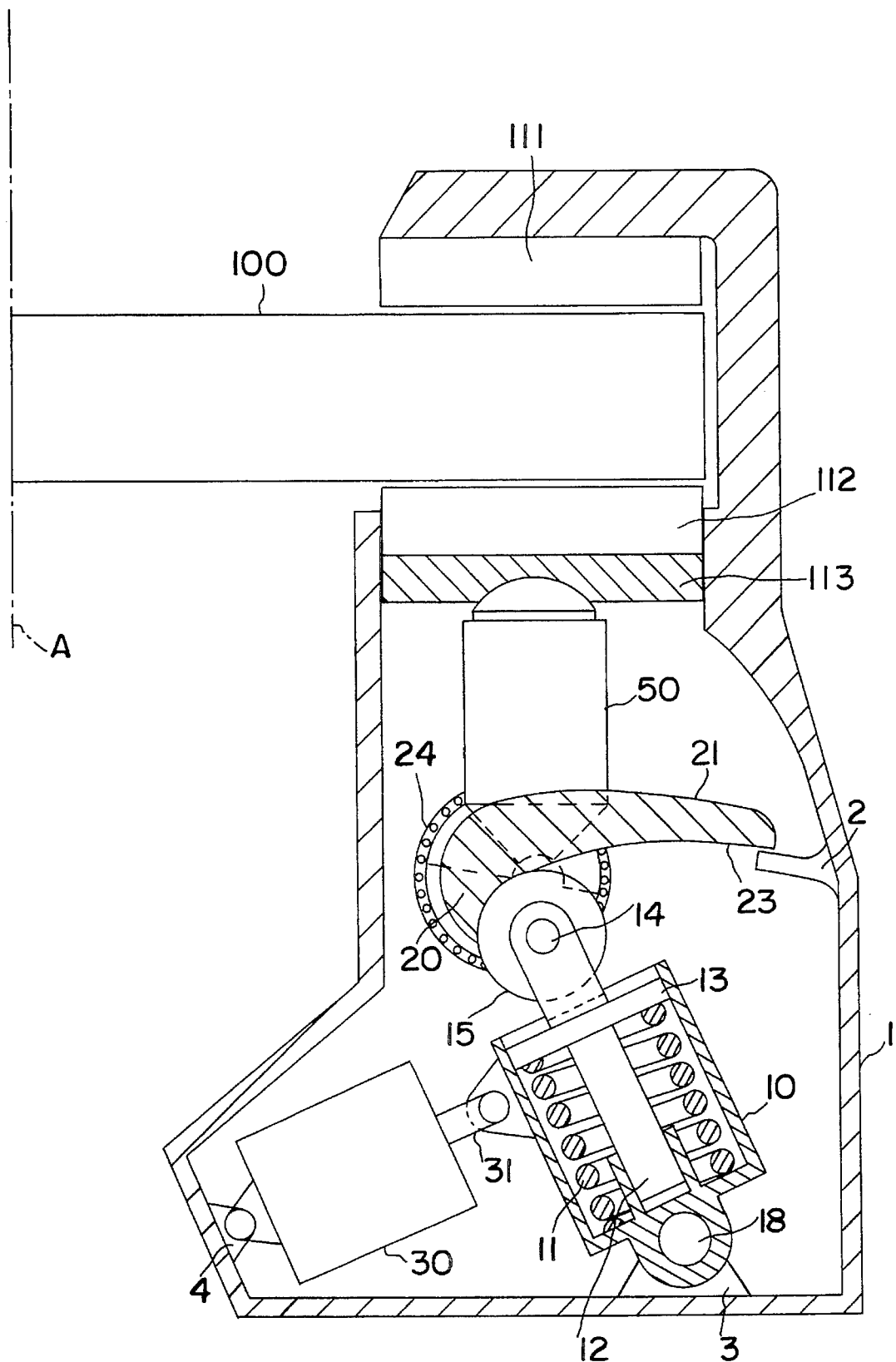
FIG. 2 is a view of a modified embodiment of the force generating system illustrated in FIG. 1 which generates the application force required for the braking in a floating caliper disk brake.

FIG. 2 illustrates a floating-caliper disk brake in which the force generating device 10 of FIG. 1 generates the required application force. As shown by a comparison of FIGS. 1 and 2, the force generating device 10 has the same construction so that the same reference numbers are also used and another explanation of its components and operation is not required. In this embodiment, the housing 1 of the force generating device at the same time forms the floating caliper of the disk brake which is disposed by a sliding bearing which is not shown so that it can be displaced along an axis A of a brake disk 100.

The rod 50 which transmits the working stroke of the force generating device has on its brake-disk-side end a hemispherical pressure piece which engages in a corresponding recess of a pressure plate 113 of a brake shoe 112. The rod 50 is therefore supported by the pressure plate 113 so that an additional guide will not be necessary.

When the adjusting arrangement 30 swivels the force cartridge 10 toward the right, the brake shoe 112 is pressed against the side of the brake disk 100 which is on the bottom in FIG. 2. During the further swivelling of the force cartridge 10, the sliding caliper or housing 1 is displaced downward because of the now contacting brake shoe 112 so that shortly afterwards the other brake shoe 111 will also rest against the opposite side of the brake disk 100. When the force cartridge 10 is swivelled still farther, a brake pressure is built up which corresponds to the swivelling angle. At the same time, an elastic deformation occurs in the application device 30 and the sliding caliper 1. When the force cartridge 10 is swivelled to the left again for the release of the brake, a considerable amount of the energy stored in this elastic deformation is stored back into the spring 11 of the force cartridge 10 so that, on the whole, a high efficiency is achieved during braking.

Figure 3A:
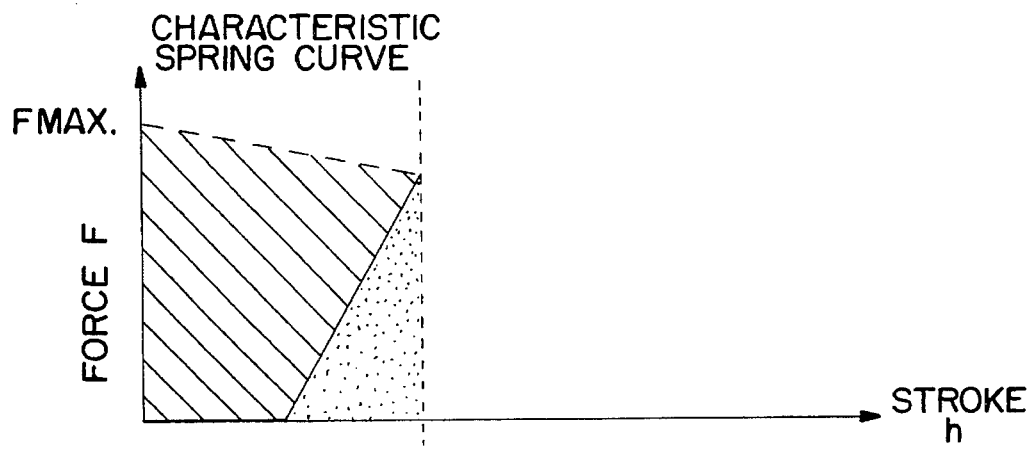
FIGS. 3A to 3C and 4A to 4C are each force/stroke diagram, force/time diagram and an output/time diagram for explaining the forces occurring during the application and the release as well as the energy consumption of a conventional force generating system (FIG. 3) and a force generating system according to the invention (FIG. 4) are used.
Figure 3B:
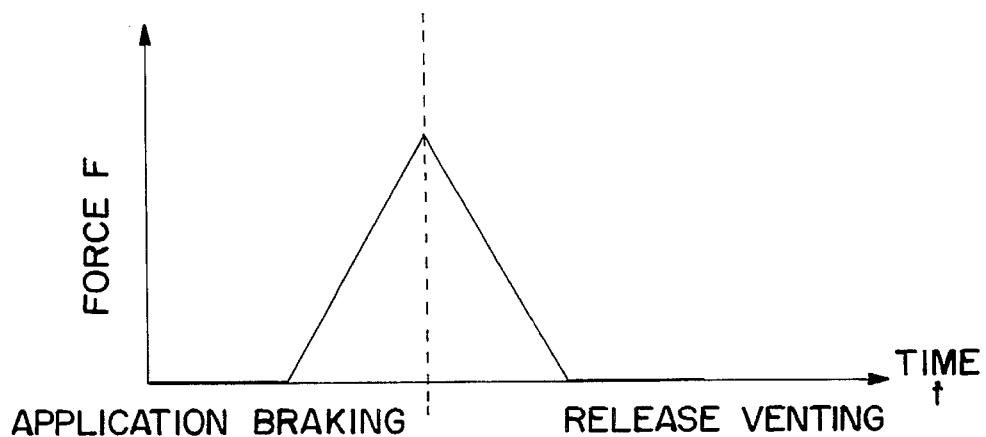
Figure 3C:
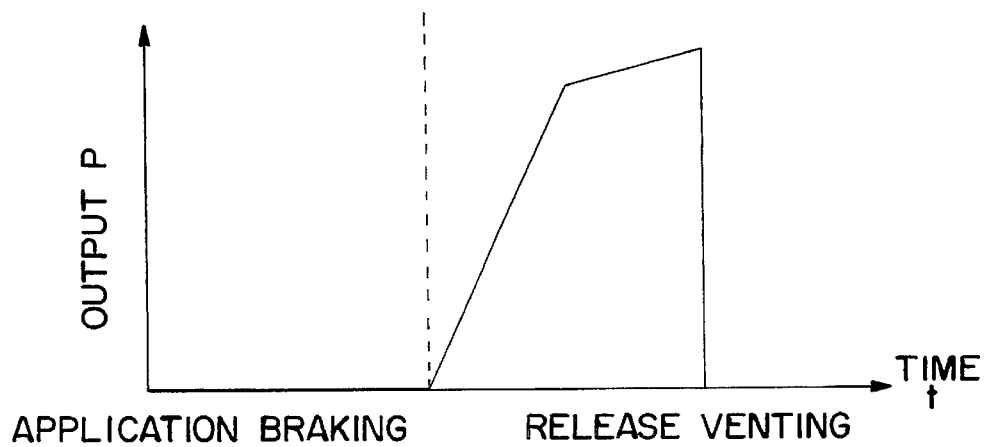

FIGS. 3A to 3C show the force and output relationships during the braking and releasing operation when a conventional compressed-air brake cylinder is used as the application device. It is assumed that a fail-safe arrangement exists, as used particularly in the case of rail vehicles. As illustrated in FIG. 3A, the spring of the compressed-air cylinder applies work during braking which corresponds to the hatched area shown underneath the characteristic spring curve. When the brake is released, so much energy must therefore be applied as a result of the supply of compressed air that the spring of the compressed-air cylinder is tensioned again. The amount of energy required for this purpose is found in the area of the output curve illustrated in FIG. 3C.

Figure 4A:
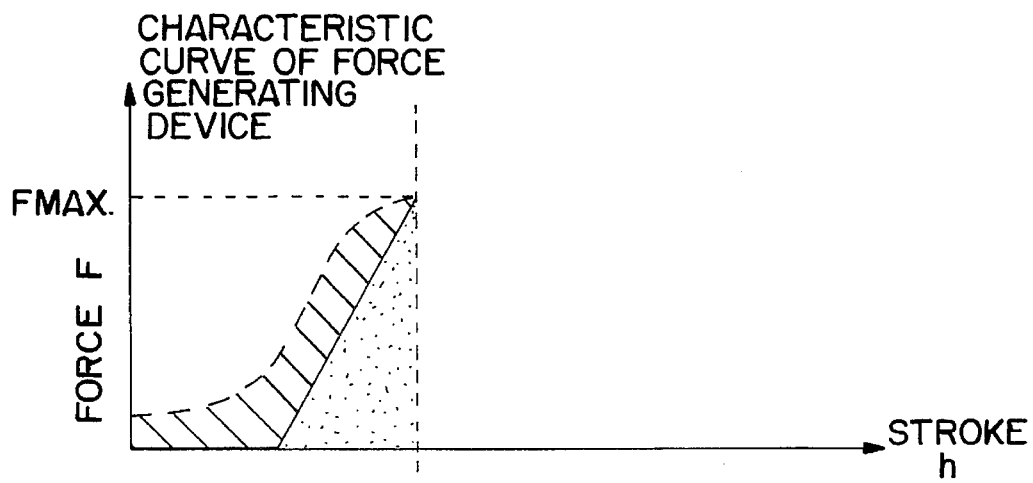
Figure 4B:
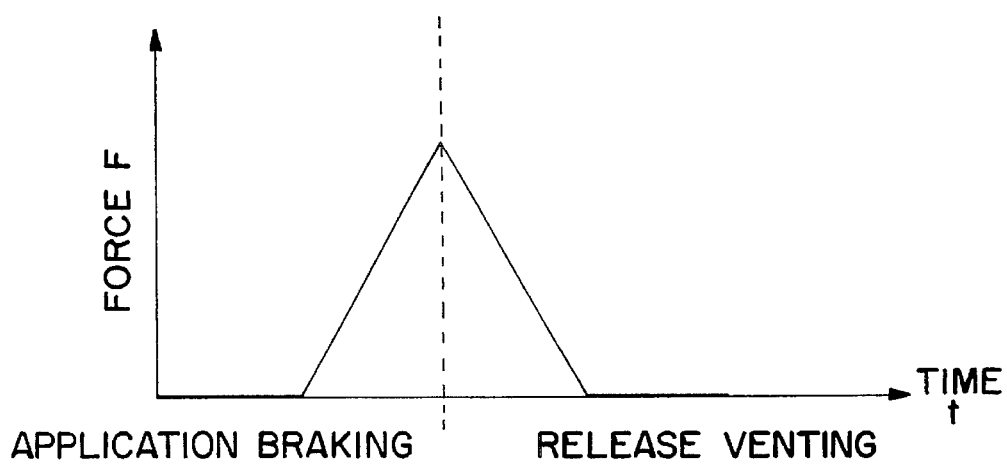
Figure 4C:
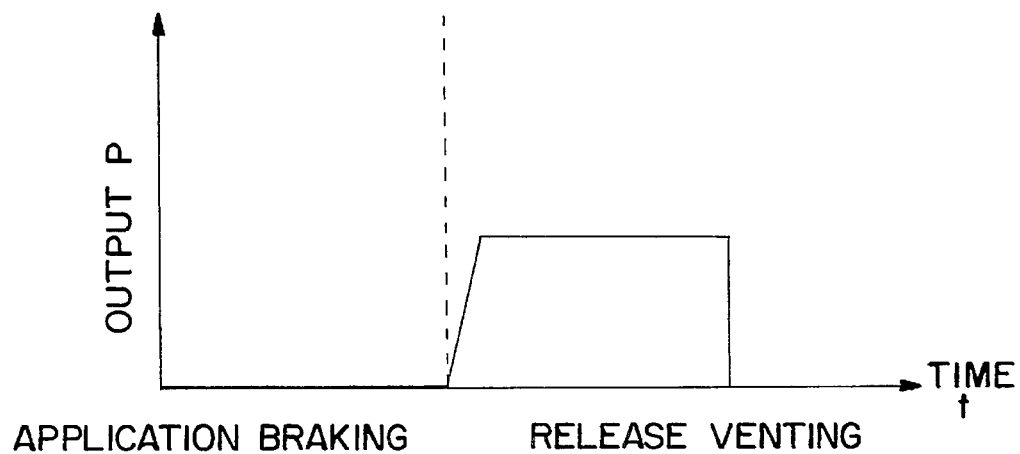

FIGS. 4A to 4C show the corresponding force and output conditions when the force generating device according to the invention is used as the application device. A comparison between FIG. 4C and FIG. 3C shows clearly that the energy requirement of the force generating device according to the invention is much more advantageous than when a conventional compressed-air cylinder or the like is used. The reason is the use, according to the invention, of the force stored in the elastic deformation for the application of the force cartridge.

Figure 5A:
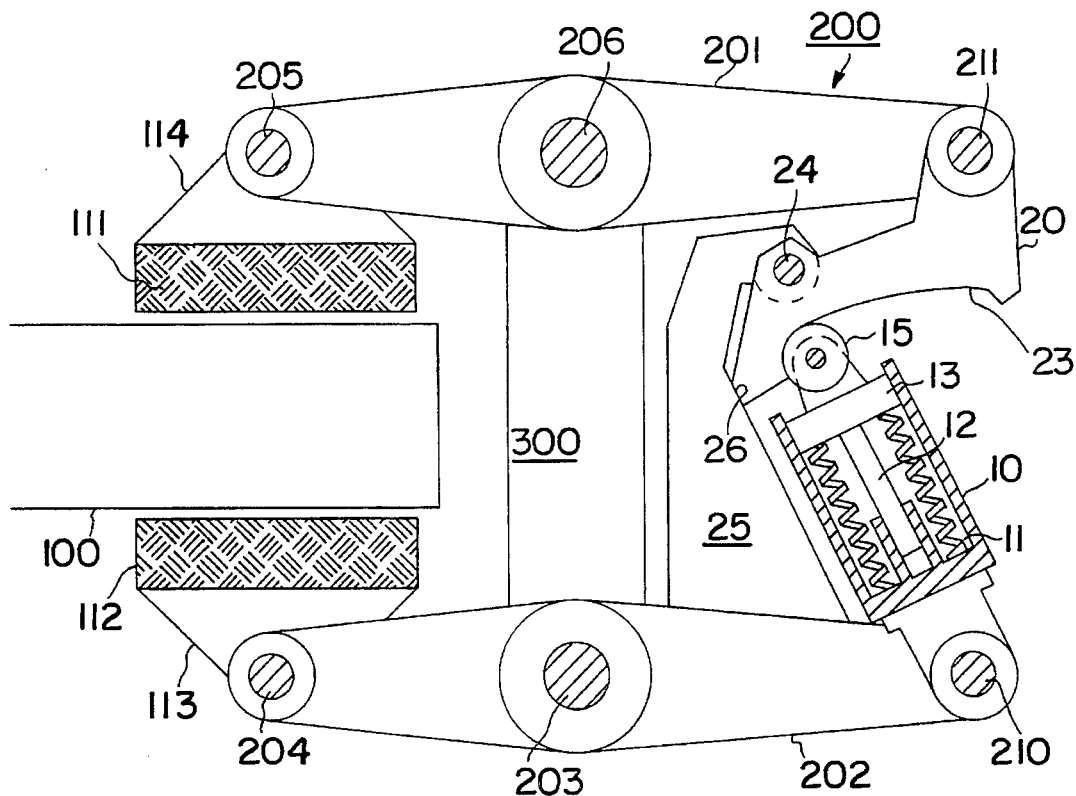
FIGS. 5A and 5B are views of an embodiment of the force generating system according to the invention as an application device of a disk brake having a brake clamp.
Figure 5B:
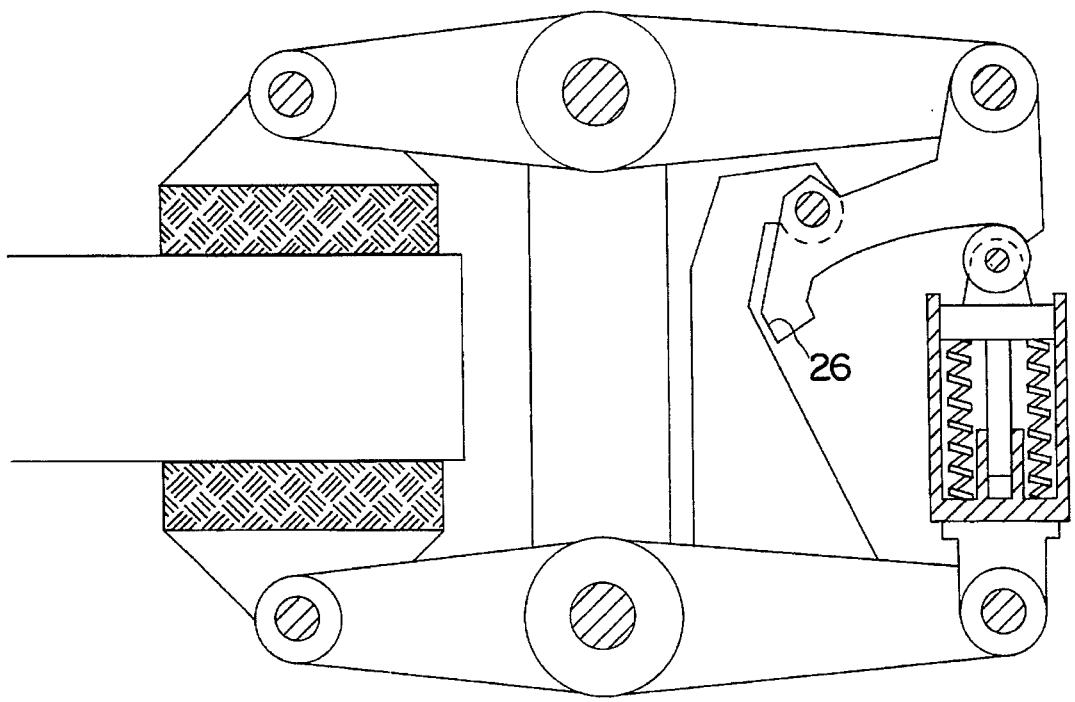

FIGS. 5A and 5B show an embodiment of the force generating device according to the invention which is used as an application device of a disk brake having a brake clamp. In this case, the brake clamp is formed of two clamp levers 201 and 202 which are supported by two pivot bearings 203 and 206 on a center connection element 300. At a first end facing a brake disk 100, each clamp lever has a bearing 204 and 205 on which a pressure piece 113 and 114 is rotatably disposed, on the brake-disk-side end of which a brake shoe 112 and 111 is fastened. On a second end of the upper clamp lever 201 which faces away from the brake disk 100, a lever mechanism 20 is rotatably disposed on a bearing 211. Furthermore, this lever mechanism 20 is rotatably disposed by a bearing 24 on a supporting element 25 which is rigidly connected with the opposite clamp lever 202. On its side facing the supporting element 25, the lever arm of the lever mechanism 20 has an end face 26 which rests against a corresponding surface of the supporting element 25 to form an end stop. On the end of the lower clamp lever 202 which faces away from the brake disk 100, a force cartridge 10 is disposed in a bearing 210 whose construction corresponds to the force cartridge illustrated in FIG. 1 so that in this regard reference can be made to that description. The roller 15 of the pressure rod 12 of the force cartridge 10 also moves in an appropriately shaped lever arm surface 23. The force cartridge 10 can be swivelled by an adjusting arrangement which is not illustrated in detail in FIGS. 5A and 5B.

FIG. 5A shows the disk brake 200 in its release position in which the two brake shoes 111 and 112 have a defined distance (venting play) from the surface of the brake disk 100. When the adjusting arrangement swivels the force cartridge 10 to the right, the venting play of the brake shoes is overcome so that, when the force cartridge 10 is swivelled farther, a corresponding brake pressure is exercised on the brake disk 100. FIG. 5B shows a drastic braking position in which the maximal braking pressure is applied and in which the maximal elastic deformation of the brake clamp therefore occurs. For the release of the brake when the force cartridge 10 is swivelled to the left again, a large amount of the energy stored in the elastic deformation is transmitted to the spring 11 of the force cartridge 10, whereby a good efficiency can be achieved.

If a fail-safe function is desired in the case of the disk brake illustrated in FIG. 5, the gradient of the lever arm surface 23 is selected such that it is directed toward the right in FIG. 5. Thus, when the adjusting arrangement fails, an automatic swivel stroke of the force cartridge 10 takes place to the right so that the drastic braking condition shown in FIG. 5B results.

The center connection element 300 may be constructed as a wear adjusting device which, as the wear of the brake shoes 111 and 112 increases, shortens the distance between the two bearings 203 and 206 to such an extent that the venting play remains essentially constant. The construction of such an adjusting device is known and is therefore not important for the invention.

Figure 6A:
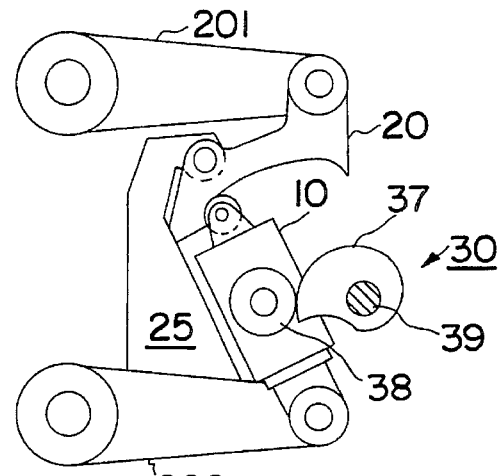
FIGS. 6A to 6C are three variants of an adjusting arrangement for changing the braking force which is suitable for the force generating system illustrated in FIG. 5.
Figure 6B:
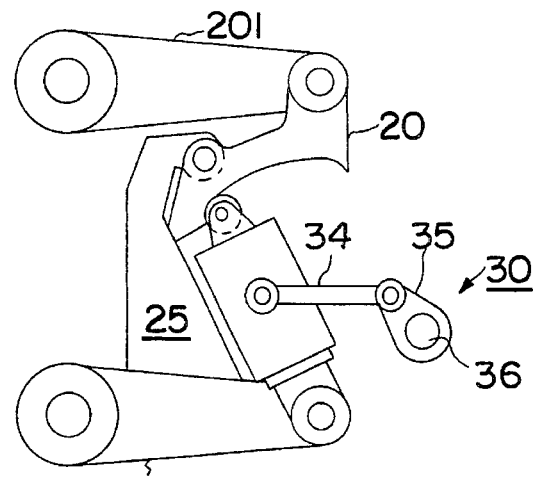
Figure 6C:
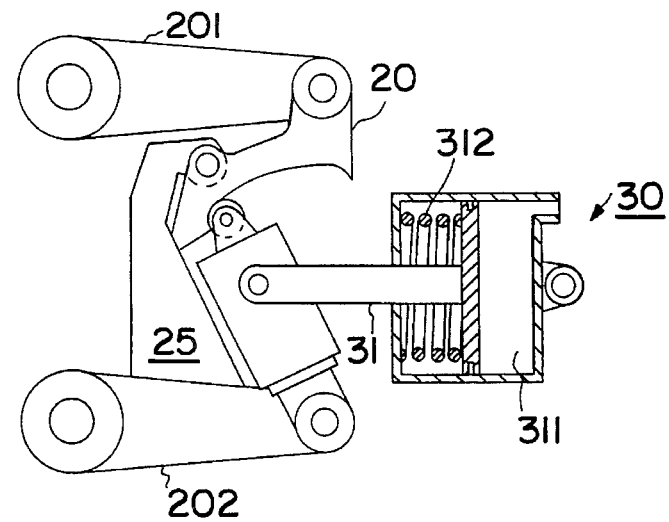

FIGS. 6A to 6C show three variants of an adjusting arrangement 30 which can be used for the swivelling of the force cartridge 10 of the application device illustrated in FIG. 5. According to FIG. 6A, an eccentric 37 may, for example, be provided which can be rotated by way of a shaft 39 that is motordriven or driven in another manner. The circularly designed outer face of the eccentric 37 rests against a roller 38 which is disposed on the housing of the force cartridge 10. When the eccentric 37 is rotated counterclockwise by the shaft 39 as illustrated in FIG. 6A, the distance to the bearing of the roller 38 is shortened. Because the gradient of the lever arm surface is directed to the right, the force cartridge 10 swivels to the right. When the eccentric 37 is rotated in the opposite direction, the force cartridge 10 is swivelled to the left again whereby the brake clamp is opened up again.

In the variant of the adjusting arrangement 30 illustrated in FIG. 6B, the force cartridge 10 is connected by a connecting rod 34 with a connecting rod element 35 which can be rotated by a motor. A rotation of the shaft 36 of the connecting rod element 35 is converted to a swivelling of the force cartridge 10 of precisely the same amount.

According to FIG. 6C, a compressed-air cylinder may also be used as the adjusting arrangement. When compressed air is admitted to a pressure chamber 311, a drive rod 31 coupled with the force cartridge 10 is displaced toward the left against the force of a spring 312, whereby the brake clamp is opened up. In contrast, when the compressed air is removed or fails, the force cartridge 10, because of the internal spring of the force cartridge, the spring 312 of the compressed-air cylinder as well as possibly of the gradient of the lever arm, is swivelled to the right and therefore applies the brake clamp.

FIG. 7 illustrates another embodiment of the force generating device according to the invention which is also provided for a disk brake with a brake clamp as the application device. The brake clamp has the same construction and the same method of operation as the brake clamp of the embodiment of FIG. 5 so that in this respect reference can be made to the constructions shown there. However, in contrast to the brake clamp of FIG. 5, in FIG. 7, the application force is supplied by the center connection element of the two clamp levers 201 and 202, whereas the connection element facing away from the brake disk is formed by an adjusting device 400.

According to FIG. 7, the central bearing 203 of the lower clamp lever 202 is disposed on a supporting element 25 of the force generating device 1 according to the invention. The central bearing 206 of the upper clamp lever 201 is disposed eccentrically on the lever mechanism 20 of the force generating device 1. The stationary bearing 24 of the lever mechanism 20 is provided on the upper end of the supporting element 25. The supporting element 25 according to FIG. 7 is shaped such that, in the released condition of the brake, the roller 15 of the force cartridge 10 is disposed directly "below" the pivot bearing 24 of the lever mechanism 20 so that the lever arm length is equal to zero. In addition, the pivot bearing 18 of the force cartridge 10 is provided on the lower supporting arm of the supporting element 25. An adjusting arrangement 30, which is constructed as a connecting rod drive corresponding to the embodiment of FIG. 6B, swivels the force cartridge 10 to the right for the application of the brake clamp. The distance between the two bearings 203 and 206 of the lower and the upper clamp lever is shortened by a path which is reduced according to the lever principles, whereby the brake clamp presses the two brake shoes 111 and 112 against the brake disk which is not shown. During the subsequent release of the brake, the adjusting arrangement 30 swivels the force cartridge 10 to the left again. The spring 11 of the force cartridge 10 is tensioned again as a result of the energy stored in the elastic deformation of the brake clamp.

Figure 8:
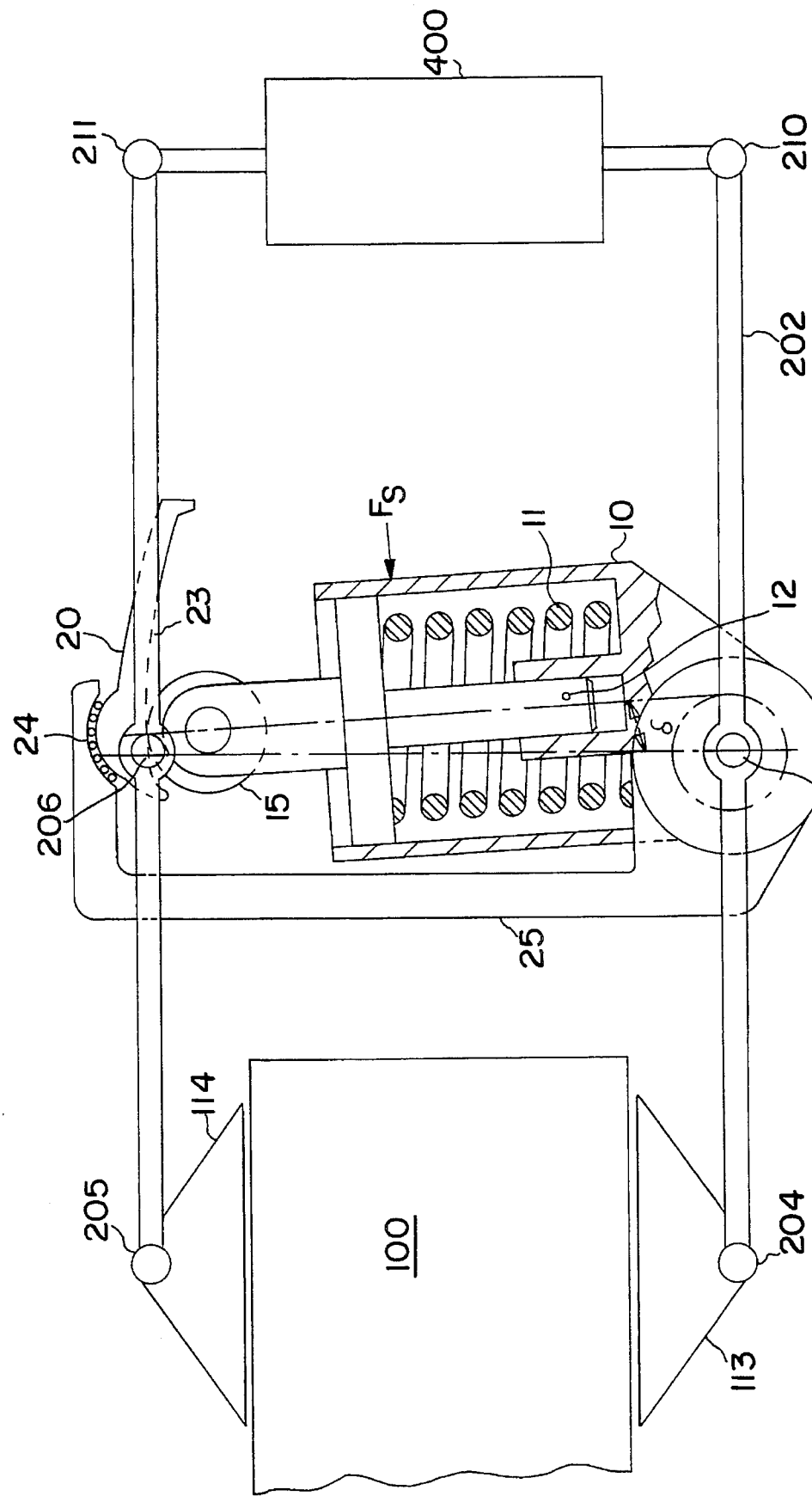
FIG. 8 is a modified embodiment of the application device illustrated in FIG. 7.

FIG. 8 is a modified embodiment of the brake clamp illustrated in FIG. 7. A first difference with respect to the embodiment of FIG. 7 is the fact that the swivel bearing 18 of the force cartridge 10 is constructed coaxially with respect to the bearing 203 of the lower clamp lever 202; that is, the bearing 203 may also be constructed as a common bearing for both parts. In order to avoid subjecting the pressure rod 12 of the force cartridge 10 to a buckling moment, the axis of the pressure rod 12 does not extend through the center of the bearing 203 but is displaced with respect to the center by an angle δ. In this case, the angle δ is selected such that the force vector of the force exercised by the force cartridge 10 on the lever 20 extends essentially through the axis of the pressure rod 12.

In a further modification of the embodiment of FIG. 7, the lever 20 of the force generating device illustrated in FIG. 8 is disposed on the upper end of the supporting element 25 in a half-shell bearing 24. The roller 15 of the pressure rod 12 of the force cartridge 10 causes the required clamping of the lever 20. As a result of this design of the bearing 24, it is possible to achieve a comparatively large dimensioning of the bearing so that correspondingly high forces can be generated and a good efficiency of the bearing is ensured.

In all above-described embodiments of the force generating device according to the invention, it is possible to provide a sensor SR which senses the position in which the roller 15 of the force cartridge 10 rests against the lever arm 21. Since this position corresponds to the respective lever arm length, the output signal of the sensor is directly proportional to the supplied force. The mentioned sensor SR may, for example, be constructed as an angle sensor which directly senses the momentary swivelling angle of the force cartridge 10. As an alternative, sensors may also be provided which detects the respective stroke of the adjusting arrangement 30 and generates a corresponding output signal.

Furthermore, in all embodiments of the force generating device according to the invention, sensor SR may be provided which senses the momentary swivelling angle of the lever 20 or the respective generated working stroke. The corresponding output signal of such a sensor is therefore proportional to the working stroke. Since the working stroke changes as a function of the respective wear of the brake shoes, this signal provides information on the respective wear of the brake shoes so that the adjusting device can be controlled correspondingly. By comparing the output signal of the working stroke sensor with that of the sensor for detecting the working position of the force cartridge 10, as required, the wear of the brake shoes may be determined in an even more precise manner.

A sensor SR is shown schematically in FIG. 1 with dashed lines to each of the elements to be sensed.

Naturally, many different modifications are possible with respect to the above-explained embodiments of the invention. Thus, in particular, the respective curved design of the running or lever arm surface 23 of the lever 20 can be adapted to the special conditions of the respective force take-up system. The type and dimensioning of the bearing of the lever 20 depends on the respective usage.

Further, it should be pointed out that the lever arm surface 23 of the lever 20 can be dimensioned such that the application stroke for overcoming the venting play can be carried out by a slight swivel movement of the force cartridge 10. For this purpose, the lever arm surface 23 is provided, for example, with a progressively "decreasing" slope in the application direction. As a result, it is possible to carry out the application stroke very rapidly so that a correspondingly larger variation range of the respective generated force is available for the braking operation.

As an alternative or in addition to this measure, the respective wear adjusting device 300 and 400 may constructed such that the fast application is carried out by the wear adjusting device while the force generating device according to the invention applies essentially the variable braking force.

Finally, it is also possible to construct the respective wear adjusting device 300 and 400 such that it has an "auxiliary release function" which becomes operative when the force generating device according to the invention jams in the application position because of a defect so that a continued movement of the vehicle is ensured at any time. For this purpose the wear adjusting device has, for example, a threaded spindle with a non-inhibiting thread and nut.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A force generating system for generating a reversible working stroke with a variable force acting upon a force take-up system which, because of varying elastic deformation, develops a counterforce which changes as a function of the stroke, comprising:

a lever mechanism including a pivot point fixed with respect to a force take-up system and including a lever arm for interacting with said force take-up system at a force application point of a given lever arm length;

an energy-storing force generating device which acts upon the lever mechanism at a changeable position of its lever arm for supplying a portion of the energy stored in it when the lever arm length is increased and, for at least partially taking up again the energy taken up by the force take-up system when the lever arm length is decreased;

an adjusting arrangement for the controllable changing of the position in which the force generating device acts upon the lever arm of the lever mechanism; and a sensor for detecting the position in which the force generating device acts upon the lever arm of the lever mechanism.

2. A force generating system according to claim 1 wherein the force generating device is swivellably disposed about a swivel point with respect to the lever mechanism and engages a lever arm surface of the lever arm having essentially the shape of a circular arc centered at said swivel point of the force generating device.

3. A force generating system according to claim 2, wherein the force generating device includes a sliding element riding along the lever arm surface of the lever arm.

4. A force generating system according to claim 3, wherein the sliding element is a roller which is disposed on a lever-side end of the force generating device.

5. A force generating system according to claim 2, wherein the lever arm surface of the lever is shaped such that the force required by the adjusting arrangement for swivelling the force generating device for enlarging the working stroke is smaller than zero.

6. A force generating system according to claim 2, wherein the lever arm surface of the lever arm is shaped such that the force required by the adjusting arrangement for swivelling the force generating device for reducing the working stroke is smaller than zero.

7. A force generating system according to claim 2, wherein the force generating device, in the position corresponding to the zero working stroke, rests against a position of the lever arm surface of the lever arm in which the lever arm length, relative to the working stroke direction, is smaller than or equal to zero.

8. A force generating system according to claim 2, wherein the lever mechanism includes a half-shell bearing at the pivot point; and the force generating device, which is supported on the lever arm surface, clamps the lever mechanism on the side opposite the half-shell bearing.

9. A force generating system according to claim 1, wherein the force generating device is dimensioned such that at least the amount of energy which is taken up by the force take-up system in the case of a maximal stroke or the largest lever arm length can be stored in the force generating device.

10. A force generating system according to claim 1 wherein, the energy-storing force generating device includes a spring-loaded arrangement.

11. A force generating system according claim 1, wherein the lever arm of the lever mechanism rests against a stationary stop in a respective end position.

12. A force generating system according to claim 1, wherein the force application point, is on the lever arm of the lever mechanism.

13. A force generating system according to claim 1, wherein the force application point is on an eccentric of the lever mechanism.

14. A force generating system according to claim 1, including a rod in a sliding guide coupling the force application point of the lever mechanism with the force take-up system.

15. A force generating system according to claim 1, wherein the adjusting arrangement includes an electric motor.

16. A force generating system according to claim 1, the adjusting arrangement includes an eccentric which can be rotated by a motor and whose eccentric surface rides on a corresponding supporting surface of the force generating device.

17. A force generating system according to claim 16, wherein the supporting surface of the force generating device 10 is a roller.

18. A force generating system according to claim 1, wherein the adjusting arrangement includes a connecting rod driving device.

19. A force generating system according to claim 1, wherein the adjusting arrangement includes a compressed-air cylinder.

20. In a brake system including a disk brake between a pair of brake shoes which form a force take-up system having elastic deformation varying over a working stroke and a force generating system for generating a reversible working stroke with a variable force to the brake shoes, the force generating system comprising:

a lever mechanism including a pivot point fixed with respect to a force take-up system and including a lever arm for interacting with said force take-up system at a force application point of a given lever arm length;

an energy-storing force generating device which acts upon the lever mechanism at a changeable position of its lever arm for supplying a portion of the energy stored in it when the lever arm length is increased and, for at least partially taking up again the energy taken up by the force take-up system when the lever arm length is decreased;

an adjusting arrangement for the controllable changing of the position in which the force generating device acts upon the lever arm of the lever mechanism; and a sensor for detecting the momentary angular position of the force generating device.

21. A brake system according to claim 20, including a brake clamp comprising a pair of clamp levers with a brake shoe on opposed first ends of each of the clamp levers, a center connection element articulately connects the centers of the clamp levers, end connection element articulately connects opposed second ends of the clamp levers, and said force generating system forms one of said connecting elements for application of the clamp levers by changing the length of the connecting element.

22. A brake system according to claim 21, wherein the force generating device is swivellable coaxially with one of the two pivot bearings of one of the connection elements.

23. A brake system according to claim 22, wherein the lever mechanism is disposed on an essentially L-shaped support to which the force generating device extends essentially in parallel in the released condition of the brake.

24. A brake system according to claim 21, wherein the force generating system is the end connection element of the two clamp levers and a wear adjusting device is the center connection of the two clamp levers.

25. A brake system according to claim 21, wherein the force generating system is the center connection element of the two clamp levers and a wear adjusting device is the end connection element.

26. A brake system according to claim 21, wherein an axis of the force generating device is arranged with respect to the lever arm surface of the lever mechanism so that no buckling moment is exercised on the force generating device.

27. A brake system according to claim 21, wherein the lever arm surface of the lever mechanism is shaped such that the venting play of the brakes shoes is overcome with a slight swivel movement of the force generating device.

28. A brake system according to claim 20, including a floating caliper displacably in parallel to an axis of rotation of the disk brake and connecting said force generating system to said brake shoes.

29. A brake system according to claim 28 including a rod connecting the force application point to a brake shoe disposed in the floating caliper.

30. A force generating system for generating a reversible working stroke with a variable force acting upon a force take-up system which, because of varying elastic deformation, develops a counterforce which changes as a function of the stroke, comprising:

a lever mechanism including a pivot point fixed with respect to a force take-up system and including a lever arm for interacting with said force take-up system at a force application point of a given lever arm length;

an energy-storing force generating device which acts upon the lever mechanism at a changeable position of its lever arm for supplying a portion of the energy stored in it when the lever arm length is increased and, for at least partially taking up again the energy taken up by the force take-up system when the lever arm length is decreased;

an adjusting arrangement for the controllable changing of the position in which the force generating device acts upon the lever arm of the lever mechanism; and a sensor for detecting a momentary working stroke.

31. A force generating system according to claim 30, wherein the sensor detects the angular position of the lever arm of the lever mechanism.

* * * * *

UNITED STATES PATENT AND TRADEMARK OFFICE
CERTIFICATE OF CORRECTION

PATENT NO. : 5,501,305
DATED      : March 26, 1996
INVENTOR(S): Joseph Staltmeir and Erich Fuderer It is certified that error appears in the above-indentified patent and that said Letters Patent is hereby corrected as shown below:

On the title page, item's [19] & [75],
Please correct the inventor's last name, which was misspelled.

The correct spelling is Joseph Staltmeir.

Signed and Sealed this

Sixteenth Day of July, 1996

Attest:

BRUCE LEHMAN

*Attesting Officer*    *Commissioner of Patents and Trademarks*